US010431812B2

(12) United States Patent
Song et al.

(10) Patent No.: US 10,431,812 B2
(45) Date of Patent: Oct. 1, 2019

(54) NON-AQUEOUS, HIGH CAPACITY CATHODE MATERIAL FOR LITHIUM SECONDARY BATTERY, AND METHOD FOR PREPARING SAME

(71) Applicant: KOREA ELECTRONICS TECHNOLOGY INSTITUTE, Seongnam-si, Gyeonggi-do (KR)

(72) Inventors: Junho Song, Seongnam-si (KR); Youngjun Kim, Seongnam-si (KR); Jeomsoo Kim, Hwaseong-si (KR); Woosuk Cho, Seongnam-si (KR); Sanggil Woo, Yongin-si (KR); Taeeun Yim, Seoul (KR); Kyungjun Lee, Seoul (KR); Yeonggwang Park, Incheon (KR)

(73) Assignee: KOREA ELECTRONICS TECHNOLOGY INSTITUTE, Seongnam-si, Gyeonggi-Do (KR)

( * ) Notice: Subject to any disclaimer, the term of this patent is extended or adjusted under 35 U.S.C. 154(b) by 3 days.

(21) Appl. No.: 15/105,474

(22) PCT Filed: Oct. 29, 2014

(86) PCT No.: PCT/KR2014/010220
§ 371 (c)(1),
(2) Date: Jun. 16, 2016

(87) PCT Pub. No.: WO2015/093725
PCT Pub. Date: Jun. 25, 2015

(65) Prior Publication Data
US 2016/0372739 A1    Dec. 22, 2016

(30) Foreign Application Priority Data
Dec. 17, 2013  (KR) .......... 10-2013-0157608

(51) Int. Cl.
*H01M 4/505* (2010.01)
*H01M 4/1397* (2010.01)
(Continued)

(52) U.S. Cl.
CPC ........ *H01M 4/1397* (2013.01); *C01G 53/006* (2013.01); *C01G 53/50* (2013.01);
(Continued)

(58) Field of Classification Search
None
See application file for complete search history.

(56) References Cited

U.S. PATENT DOCUMENTS

2006/0239883 A1* 10/2006 Kang .................... C01B 13/185
423/304
2009/0087746 A1    4/2009 Kang et al.
(Continued)

FOREIGN PATENT DOCUMENTS

KR    1020120069398 A    6/2012
KR    1020130080565 A    7/2013

OTHER PUBLICATIONS

European Search Report dated Nov. 18, 2016, corresponding to European Publication No. 14873050.0.
(Continued)

*Primary Examiner* — Tracy M Dove
(74) *Attorney, Agent, or Firm* — Hauptman Ham, LLP

(57) ABSTRACT

The present invention relates to a non-aqueous cathode material for lithium secondary batteries using a spherical transition metal complex carbonate, and a method for preparing same. According to the present invention, since the surface of a spherical transition metal complex carbonate, which is prepared by using a cobalt material, nickel material, manganese material, carboxyl group material, and ammonia material, is coated with titanium dioxide. In addition, by
(Continued)

mixing the prepared, surface-coated transition metal complex carbonate with a lithium material and heat-treating the resultant material, it is possible to prepare a spherical Li-rich cathode material having a primary particle size of 200 nm or more, and a 0.1 C capacity of 250 mAh/g or more, and capable of implementing 96% or more of the initial capacity in a full cell after charging and discharging 60 times.

7 Claims, 14 Drawing Sheets

(51) Int. Cl.
| | |
|---|---|
| H01M 4/525 | (2010.01) |
| H01M 4/131 | (2010.01) |
| H01M 4/1391 | (2010.01) |
| H01M 4/36 | (2006.01) |
| H01M 4/58 | (2010.01) |
| C01G 53/00 | (2006.01) |
| H01M 4/04 | (2006.01) |
| H01M 4/136 | (2010.01) |
| H01M 4/48 | (2010.01) |
| H01M 10/0525 | (2010.01) |
| H01M 4/02 | (2006.01) |

(52) U.S. Cl.
CPC ......... *H01M 4/0402* (2013.01); *H01M 4/043* (2013.01); *H01M 4/0471* (2013.01); *H01M 4/131* (2013.01); *H01M 4/136* (2013.01); *H01M 4/1391* (2013.01); *H01M 4/366* (2013.01); *H01M 4/483* (2013.01); *H01M 4/505* (2013.01); *H01M 4/525* (2013.01); *H01M 4/5825* (2013.01); *H01M 10/0525* (2013.01); *C01P 2002/72* (2013.01); *C01P 2002/85* (2013.01); *C01P 2004/03* (2013.01); *C01P 2004/62* (2013.01); *C01P 2004/80* (2013.01); *C01P 2006/40* (2013.01); *C01P 2006/90* (2013.01); *H01M 2004/028* (2013.01)

(56) References Cited

U.S. PATENT DOCUMENTS

2009/0305136 A1 12/2009 Yada et al.
2012/0156565 A1 6/2012 Kim et al.

OTHER PUBLICATIONS

D. K. Lee et al.,"High capacity Li[Li0.2Ni0.2Mn0.6]O2 cathode materials via a carbonate co-precipitation method", ScienceDirect, Journal of Power Sources, Sep. 12, 2006, vol. 162, 1346-1350.
International Search Report for PCT/KR2014/010220 dated Feb. 6, 2015.

* cited by examiner precursor

Cathode

| Element | Wt% | At% |
|---|---|---|
| MnK | 65.21 | 66.73 |
| CoK | 12.83 | 12.24 |
| NiK | 21.97 | 21.03 |
| TiK | 0 | 0 |
| Matrix | Correction | ZAF | precursor

| Element | Wt% | At% |
|---|---|---|
| MnK | 65.03 | 66.32 |
| CoK | 12.06 | 11.46 |
| NiK | 21.26 | 20.29 |
| TiK | 1.65 | 1.93 |
| Matrix | Correction | ZAF |

Cathode

| Element | Wt% | At% |
|---|---|---|
| MnK | 65.49 | 66.89 |
| CoK | 12.79 | 12.19 |
| NiK | 20.06 | 19.17 |
| TiK | 1.65 | 1.76 |
| Matrix | Correction | ZAF |

Cathode

| Element | Wt% | At% |
|---|---|---|
| MnK | 66.04 | 67.41 |
| CoK | 13.54 | 12.89 |
| NiK | 19.48 | 18.61 |
| TiK | 0.93 | 1.09 |
| Matrix | Correction | ZAF |

Cathode

NON-AQUEOUS, HIGH CAPACITY CATHODE MATERIAL FOR LITHIUM SECONDARY BATTERY, AND METHOD FOR PREPARING SAME

CROSS REFERENCE TO RELATED APPLICATIONS

This application claims the priority of Korean Patent Application No. 10-2013-0157608 filed on Dec. 17, 2013 in the Korean Patent and Trademark Office. Further, this application is the U.S. National Phase Entry of International Application No. PCT/KR2014/010220 filed on Oct. 29, 2014, which is incorporated herein by reference in its entirety.

TECHNICAL FIELD

The present invention relates to a non-aqueous cathode material for a lithium secondary battery and a method of preparing the same, and, more particularly, to a non-aqueous cathode material for a lithium secondary battery capable of realizing high capacity and outstanding life expectancy by containing a spherical transition metal complex carbonate whose surface is coated with nano-sized titanium dioxide and a method of preparing the same.

BACKGROUND ART

As the use of small portable electronic devices becomes universal, the development of new secondary batteries, such as nickel hydrogen batteries or lithium (Li) secondary batteries, is actively in progress. Li secondary batteries among them are batteries that use carbon such as graphite as an anode active material, an oxide containing Li as a cathode active material, and a non-aqueous solvent as an electrolyte. Since Li is a metal with a very high ionization tendency and enables high-voltage generation, the development of batteries with high energy density is in progress.

As the cathode active material, Li transition metal oxides containing Li are most commonly used. 90% or more of such Li transition metal oxides are layered Li transition metal oxides, such as cobalt-based Li transition metal oxides, nickel-based Li transition metal oxides, and ternary Li transition metal oxides in which cobalt, nickel, and manganese coexist.

Although the development of a so-called Li-rich (Li-rich-based) high-capacity cathode material for high voltage is recently in progress, the capacity of 250 mAh/g or more is possible only when the primary particle size is 200 nm or less, in which case, the specific surface area increases, making an actual application of the material in a battery difficult to realize.

DISCLOSURE

Technical Problem

A lithium (Li)-rich cathode material attains a layered structure capable of realizing high capacity as a $Li_2MnO_3$ phase undergoes an electrochemical activation process during the first charging process, and such a reaction is limited by the primary particle size of the cathode material that has been prepared. It is known that a capacity of 200 mAh/g or less can be realized in the case of a Li-rich cathode material whose primary particle size is 500 nm or more, and that a capacity of 200 mAh/g or more can be realized only when the primary particle size is 200 nm or less. The minimization of the primary particle size of such a Li-rich-based cathode material in pursuit of high capacity results in an increase in the specific surface area, thus making an actual application of the material in a battery difficult to realize.

Therefore, the present invention is directed to providing, through using a spherical transition metal complex carbonate whose surface is coated with nano-sized titanium dioxide to substitute titanium into $Li_2MnO_3$ and to thereby facilitate an electrochemical activation reaction during the first charging process, a Li-rich cathode material capable of realizing the capacity of 250 mAh/g or more even when the primary particle size is as large as 200 nm or more and maintaining 94% or more of the initial capacity even after 40 cycles of charging and discharging and a method of preparing the same.

Technical Solution

To achieve the aforementioned object, the present invention provides a method of preparing a non-aqueous cathode material for a lithium secondary battery, wherein the method includes a process of preparing a spherical transition metal complex carbonate substituted with other metals by co-precipitating an aqueous solution in which a nickel material, a cobalt material, a manganese material, a carboxyl group material, and an ammonia material are mixed, a process of coating a surface of the spherical transition metal complex carbonate with nano-sized titanium dioxide, and a process of mixing a lithium (Li) material with the transition metal complex carbonate coated with titanium dioxide and heat-treating the mixture to prepare a spherical Li-rich cathode material substituted with other metals.

In the coating process of the method of preparing the non-aqueous cathode material for a lithium secondary battery according to the present invention, the transition metal complex carbonate coated with nano-sized titanium dioxide may have a composition ratio of $Ni_xCo_yMn_{1-x-y}Ti_zCO_3$ ($0.0<x\leq0.3$, $0.0<y\leq0.2$, $0.01\leq z\leq0.1$, $0.5\leq 1-x-y$) and an average particle size of 5 to 25 μm.

In the process of preparing the transition metal complex carbonate of the method of preparing the non-aqueous cathode material for a lithium secondary battery according to the present invention, the concentration of each of the nickel material, cobalt material, manganese material, carboxyl group material, and ammonia material is in a range of 0.5 to 2 M, the materials are co-precipitated in a ratio of (nickel material+cobalt material+manganese material):carboxyl group material:ammonia material=1:1.8 to 2.5:0.5 to 1.5 or less, and the pH of the mixed aqueous solution may be maintained in a range of 7 to 9.

In the coating process of the method of preparing the non-aqueous cathode material for a lithium secondary battery according to the present invention, a suspension containing nano-sized titanium dioxide may be used to coat a surface of the transition metal complex carbonate. In other words, the coating process may include a process of mixing the transition metal complex carbonate with a suspension containing nano-sized titanium dioxide, and coating a surface of the transition metal complex carbonate with the nano-sized titanium dioxide by drying the suspension that was mixed with the transition metal complex carbonate.

In the process of preparing the Li-rich cathode material of the method of preparing the non-aqueous cathode material for a lithium secondary battery according to the present invention, the Li-rich cathode material may be prepared by mixing lithium carbonate with the transition metal complex carbonate coated with titanium dioxide and then heat-treating the mixture.

In the process of preparing the Li-rich cathode material of the method of preparing the non-aqueous cathode material for a lithium secondary battery according to the present invention, the heat treatment may be performed at 900 to 1100° C.

The method of preparing the non-aqueous cathode material for a lithium secondary battery according to the present invention may further include a process of pulverizing the Li-rich cathode material into a powder after the process of preparing the Li-rich cathode material.

Also, the present invention provides a non-aqueous cathode material for a lithium secondary battery, wherein the non-aqueous cathode material has a composition ratio of $Li_wNi_xCo_yMn_{1-x-y-z}Ti_zO_2$ ($0.0<x\leq0.3$, $0.0<y<0.2$, $0.5\leq1-x-y-z$, $0.01\leq z\leq0.1$, $1.2\leq w\leq1.7$), is spherical, and has an average particle diameter in a range of 5 to 25 μm.

Advantageous Effects

According to the present invention, since the spherical transition metal complex carbonate whose surface is uniformly coated with nano-sized titanium dioxide through the co-precipitation process and the spherical lithium (Li)-rich cathode material prepared using the spherical transition metal complex carbonate can be prepared into a form which is substituted with other elements that diffused from a surface of the particle to the interior, the cathode material prepared as thus can realize a capacity of 250 mAh/g or more at room temperature despite having a primary particle size that is as large as 200 nm or more.

In addition, since the cathode material of the present invention is substituted with other elements that uniformly diffused from a surface of the particle to the interior, structural changes that result from charging and discharging can be effectively inhibited, and thus, the life expectancy can be improved.

MODES OF THE INVENTION

The following descriptions will be made focusing on configurations necessary for understanding operations according to embodiments of the present invention. Therefore, descriptions of other configurations that might obscure the gist of the present invention will be omitted.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way. Therefore, since the embodiments described in this specification and configurations illustrated in drawings are only exemplary embodiments and do not represent the overall technological scope of the invention, it is to be understood that the invention covers various equivalents, modifications, and substitutions at the time of filing of this application.

Hereinafter, exemplary embodiments according to the present invention will be described in detail with reference to the accompanying drawings.

The method of preparing a non-aqueous cathode material for a lithium (Li) secondary battery of the present invention can be described as follows with reference to FIG. 1. Here, FIG. 1 is a flowchart of a method of preparing a non-aqueous cathode material for a Li secondary battery of the present invention.

Figure 1:
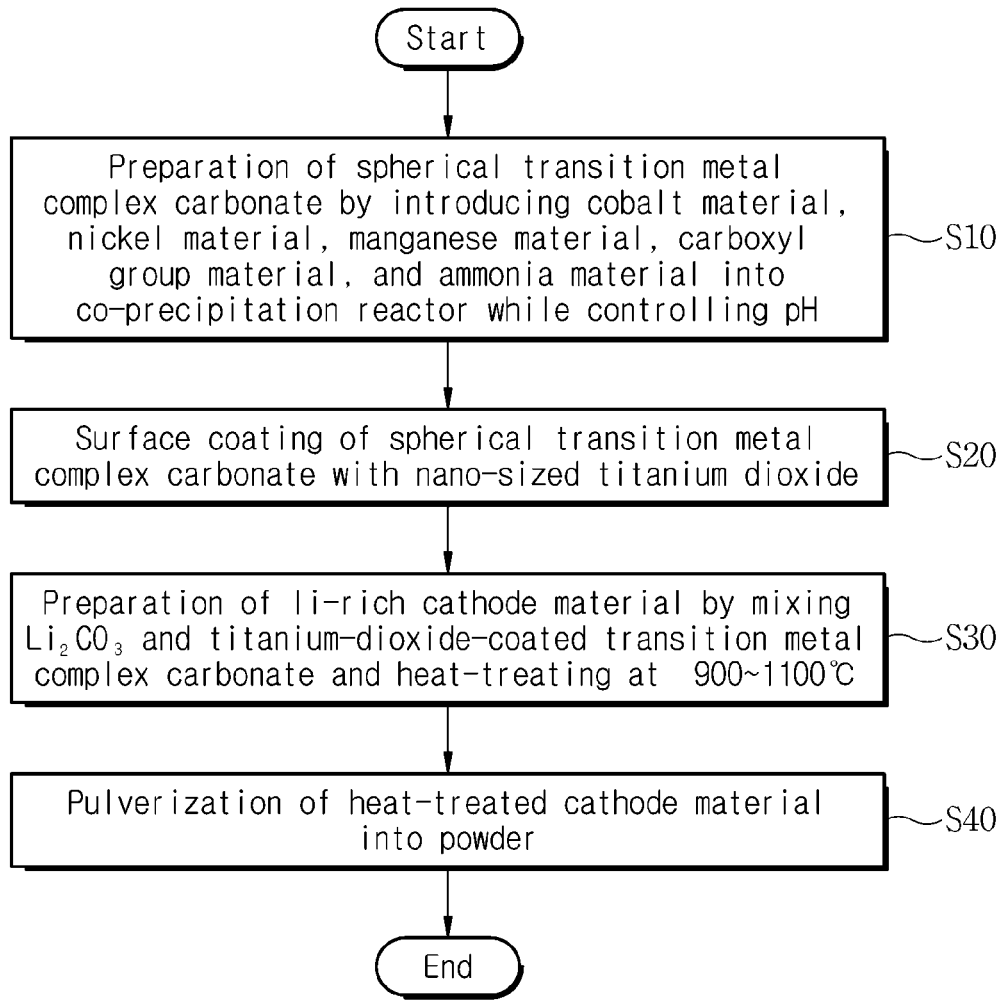
FIG. 1 is a flowchart of a method of preparing a non-aqueous cathode material for a lithium (Li) secondary battery of the present invention.

Referring to FIG. 1, the method of preparing a non-aqueous cathode material for a Li secondary battery of the present invention includes a process S10 of preparing a transition metal complex carbonate, a process S20 of coating a surface of the transition metal complex carbonate with titanium dioxide, and a process S30 of preparing a Li-rich cathode material, and may further include a pulverization process S40. Here, an aqueous solution containing a mixture of a cobalt material, a nickel material, a manganese material, a carboxyl group material, and an ammonia material was co-precipitated during the process S10 of preparing a transition metal complex carbonate to prepare a spherical transition metal complex carbonate substituted with other metals. Next, a suspension containing nano-sized titanium dioxide is used during the post-processing S20 of the transition metal complex carbonate to coat a surface of the transition metal complex carbonate with the nano-sized titanium dioxide. Lithium carbonate is mixed with the transition metal complex carbonate during the process S30 of preparing a Li-rich cathode material and then a heat treatment is performed to prepare a Li-rich cathode material. Finally, during the pulverization process S40, the Li-rich cathode material is pulverized into a powder.

Such a method of preparing a non-aqueous cathode material for a Li secondary battery of the present invention can be described in detail as follows.

First, during the process S10 of preparing a transition metal complex carbonate, a cobalt material, a nickel material, a manganese material, a carboxyl group material, and an ammonia material are continuously introduced into a co-precipitation reactor while controlling the pH to prepare a spherical transition metal complex carbonate according to Molecular Formula 1, wherein the spherical transition metal complex carbonate is substituted uniformly with other metals. In other words, the transition metal complex carbonate is prepared through 50 to 100 hours of reaction while controlling the concentration of the raw materials so that each raw material concentration falls within a range of 0.5 to 2.0 M and a ratio of (cobalt material+nickel material+manganese material):carboxyl group material:ammonia material=1:1.8 to 2.5:0.5 to 1.5 is attained. When the ratio is not within the provided range, the pH deviates from a range of 7 to 9, resulting in an independent precipitation, rather than a homogeneous precipitation, of transition metals and other metals, and thus, a transition metal complex carbonate substituted uniformly cannot be obtained. Also, since the rate of particle formation is relatively low, particles (a transition metal complex carbonate) with a size of 5 μm or less are produced, and the particles are much less likely to be spherical when the reaction time is less than 50 hours. In contrast, when the reaction time exceeds 100 hours, particles with an average size greater than 25 μm are produced.

$Ni_xCo_yMn_{1-x-y}CO_3$     [Molecular Formula 1]

(0.0<x≤0.3, 0.0<y<0.2, 0.5≤1−x−y)

In this case, a spherical transition metal complex carbonate with a particle size of 5 to 25 μm and a composition ratio of Molecular Formula 1 may be prepared by performing the precipitation accordingly during the process S10 of preparing a transition metal complex carbonate.

Here, the cobalt material includes, but is not limited to, at least one of a cobalt metal, cobalt oxalate, cobalt acetate, cobalt nitrate, and cobalt sulfate. The nickel material includes, but is not limited to, a nickel metal, nickel oxalate, nickel acetate, nickel nitrate, and nickel sulfate. The manganese material includes, but is not limited to, a manganese metal, manganese oxalate, manganese acetate, manganese nitrate, and manganese sulfate.

During the process S20 of coating a surface of the transition metal complex carbonate, the spherical transition metal complex carbonate is immersed in an ethanol suspension containing titanium dioxide at 0.1 to 5 wt %, and the mixture is blended by constant stirring. After 10 to 30 minutes of stirring, the suspension mixed with the transition metal complex carbonate is dried, i.e., the ethanol (solvent) is evaporated, at a temperature of 40 to 80° C. to prepare a transition metal complex carbonate whose surface is coated with the titanium dioxide. In this case, a spherical transition metal complex carbonate coated with titanium dioxide and having a particle size of 5 to 25 μm and a composition ratio of Molecular Formula 2 may be formed during the process S20 of coating a surface of the transition metal complex carbonate.

$Ni_xCo_yMn_{1-x-y}Ti_zCO_3$     [Molecular Formula 2]

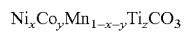

(0.0<x≤0.3, 0.0<y<0.2, 0.01≤z≤0.1, 0.5≤1−x−y)

The nano-sized titanium dioxide includes titanium dioxide whose particle size is in a range of 10 to 50 nm, and titanium tetrachloride, etc. cannot be used because chlorine gas is generated during the final heat treatment process. When the titanium dioxide has a particle size less than 10 nm, an insufficient amount thereof is coated on a surface of the transition metal complex carbonate, and thus, uniform diffusion and substitution into the final cathode material are difficult to achieve. In contrast, titanium dioxide with a particle size exceeding 50 nm is not uniformly coated on the transition metal complex carbonate, and thus, uniform diffusion and substitution into the final cathode material are difficult to achieve.

$Li_wNi_xCo_yMn_{1-x-y}Ti_zO_2$     [Molecular Formula 3]

(0.0<x≤0.3, 0.0<y<0.2, 0.5≤1−x−y, 0.01≤z≤0.1, 1.2≤w≤1.7)

The Li-rich cathode material prepared during the process S30 of preparing a Li-rich cathode material is a spherical Li-rich cathode material with a composition ratio of Molecular Formula 3 and an average particle size of 5 to 25 μm. The Li-rich cathode material according to Molecular Formula 3 is the final cathode material prepared according to the present invention.

A Li-rich cathode material substituted with other metals that were diffused thereinto may be prepared by reacting a Li material with the transition metal complex carbonate that was prepared during the process S20 of coating a surface of the transition metal complex carbonate. In other words, a non-aqueous Li-rich cathode material for a Li secondary battery may be prepared by mixing a Li material with the transition metal complex carbonate that has been prepared and then performing a heat treatment. In this case, the heat treatment is performed at a temperature in a range of 900 to 1100° C. in an air atmosphere to prepare the final Li-rich cathode material. At a temperature of 900° C. or less, the heat treatment is not sufficiently carried out such that the available capacity is reduced to 150 mAhg$^{-1}$ or less. In contrast, when the heat treatment is carried out at a temperature of 1100° C. or more, excessive (more than what is required) reactions occur such that large particles greater than 25 μm are produced, resulting in reduced power output characteristics.

In the meantime, to prepare a cathode plate, the pulverization process S40 may be carried out, by pulverizing the heat-treated cathode material after the process S30 of preparing the Li-rich cathode material. In this case, the pulverization is carried out in a conventional manner Exemplary means of pulverization include a mortar, a ball mill, a vibrating mill, a planetary ball mill, a tube mill, a rod mill, a jet mill, a hammer mill, and the like, and filtering may be performed as necessary to obtain a desired particle distribution. An average particle size of the cathode material powder of the present invention is preferably in a range of 5 to 25 μm.

The preparation method of a Li secondary battery employing the cathode material of the present invention is not different from that of conventional Li secondary batteries, except for a difference in the cathode material. The preparation of a cathode plate and the configuration of the Li secondary battery will be described briefly, but they are not limited to the descriptions provided as follows.

A cathode plate is prepared by adding, to the cathode material powder of the present invention, a conductive agent, a binding agent, a filler, a dispersant, an ion conductive agent, a pressure enhancing agent, etc. and one, or two or more types of additives as necessary and making them into a slurry or paste in a suitable solvent (organic solvent). Then, what was prepared by applying the slurry or paste obtained as the above on an electrode-support substrate by a doctor-blade method or the like, drying, and pressing the same by rolling or the like is used as the cathode plate.

Examples of the conductive agent include graphite, carbon black, acetylene black, Ketjen Black, carbon fibers, and metal powders. As the binding agent, a PVdF, a polyethylene, or the like may be used. The electrode-support substrate (also known as a collector) may be composed of foil or a sheet made of copper, nickel, stainless steel, aluminum, or the like. Alternatively, the electrode-support substrate may be composed of a carbon fiber, or the like.

A cathode prepared as thus is used to prepare a Li secondary battery. The Li secondary battery may take any form among that of a coin, a button, a sheet, a cylinder, and a prism. The anode material, electrolyte, separator, and the like of the Li secondary battery are chosen among those used in conventional Li secondary batteries.

Here, a carbon material such as graphite, or one, or two or more types of transition metal complex oxides or the like may be used as the anode material. In addition, silicon, tin, or the like may also be used as the anode material.

As the electrolyte, any of a non-aqueous electrolyte prepared by dissolving a Li salt in an organic solvent, an inorganic solid electrolyte, an inorganic solid electrolyte composite, and the like may be used.

As the solvent for the non-aqueous electrolyte, one, or two or more among esters such as ethylene carbonate, propylene carbonate, dimethyl carbonate, diethyl carbonate, and methylethyl carbonate, lactones such as butyl lactone, ethers such as 1,2-dimethoxyethane and ethoxy methoxy ethane, nitriles such as acetonitrile, and the like may be used.

Examples of the Li salt in the non-aqueous electrolyte may include $LiAsF_6$, $LiBF_4$, $LiPF_6$, and the like.

In addition, as the separator, a porous film made of a polyolefin such as a PP and/or PE or a porous material such as non-woven fabric may be used.

EXAMPLES AND COMPARATIVE EXAMPLES

The Li-rich cathode material according to Example 1 is prepared as follows.

A 1.5 M cobalt sulfate solution, a 1.5 M nickel sulfate solution, a 1.5 M manganese sulfate solution, a 1.5 M sodium carbonate solution, and a 1.5 M ammonia solution were introduced in a ratio of 0.10:0.20:0.70:1.05:0.60 into a co-precipitation reactor at a rate of 20 cc per hour and were reacted for 80 hours or more to prepare a spherical transition metal complex carbonate substituted with other metals. The transition metal complex carbonate prepared as thus was immersed into an ethanol-based suspension containing 30 nm-sized titanium dioxide at 0.5 wt %, at a ratio of 50% in terms of weight, stirred for 20 minutes, and then the ethanol was evaporated at a temperature of 80° C. to prepare a spherical transition metal complex carbonate whose surface is coated with the titanium dioxide. Lithium carbonate and the obtained spherical transition metal complex carbonate whose surface is coated with the titanium dioxide were maintained in air at 950° C. for 15 hours while the mole ratio of Li to transition metals was set to 1.50 to prepare the final cathode material according to Example 1.

The cathode material powder according to Example 1 was filtered so that the average particle diameter became 20 μm. A slurry was prepared using the cathode material at 90 wt %, acetylene black as a conductive agent at 5 wt %, PVdF as a binding agent at 5 wt %, and NMP as a solvent. The slurry was applied on 20 μm thick aluminum foil, dried, subsequently compacted by a press, and dried in vacuum at 120° C. for 16 hours to prepare a disk-type electrode with a 16 mm diameter.

Li metal foil punched with a hole diameter of 16 mm was used as the opposing electrode, and a PP film was used as the separator. As the electrolyte, a 1 M solution prepared by mixing $LiPF_6$ with EC/DME (1:1 v/v) was used. The separator was impregnated with the electrolyte, inserted between the working electrode and the opposing electrode, and was evaluated using a SUS casing as a test cell for electrode evaluation.

The cathode materials according to Example 2, Comparative Example 1, and Comparative Example 2 were prepared under the conditions disclosed in Table 1. The cathode material prepared according to the preparation method of Comparative Example 1 does not contain titanium dioxide. In the case of Comparative Example 2, nano-sized titanium dioxide was co-precipitated together with a cobalt material, a nickel material, a manganese material, a carboxyl group material, and an ammonia material to prepare a transition metal complex carbonate, which was used to prepare the cathode material.

Figure 2:
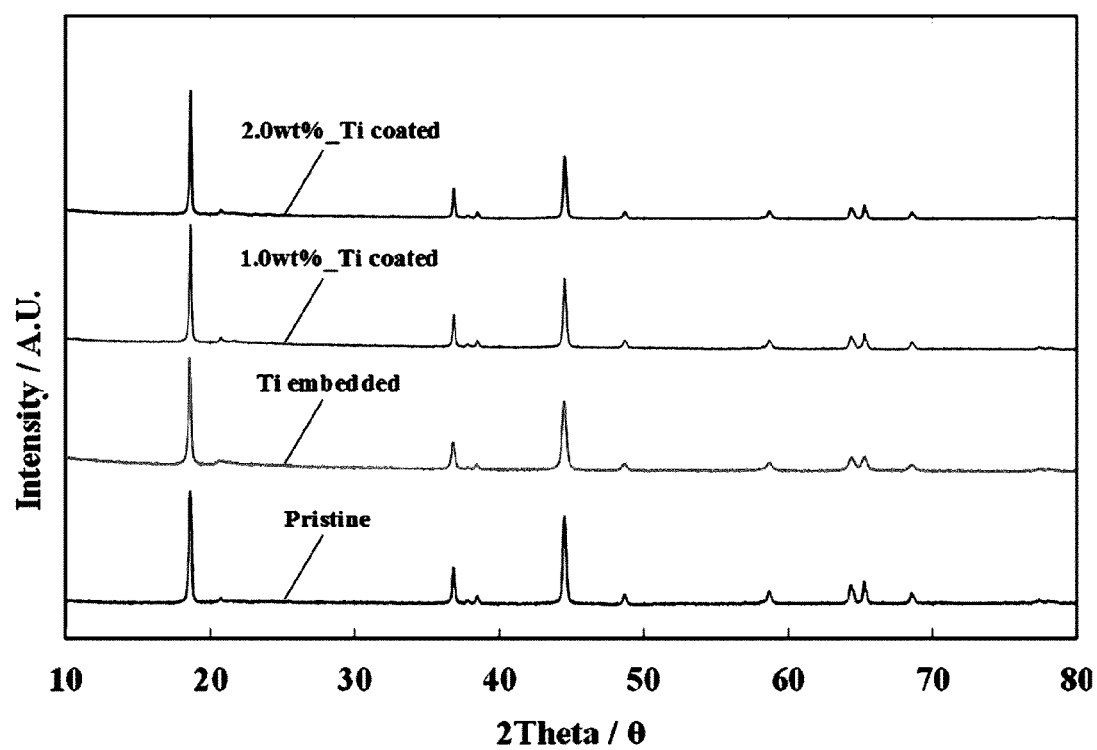
FIG. 2 is a graph showing the results of an XRD structural analysis performed on non-aqueous cathode materials for a Li secondary battery, wherein the non-aqueous cathode materials were prepared according to the preparation methods of Examples 1 and 2 and Comparative Examples 1 and 2 shown in FIG. 1.

FIG. 2 is a graph showing the results of an XRD structural analysis performed on non-aqueous cathode materials for a Li secondary battery, wherein the non-aqueous cathode materials were prepared according to the preparation methods of Examples 1 (1 wt %_Ti coated) and 2 (2 wt %_Ti coated) and Comparative Examples 1 (Pristine) and 2 (Ti embedded) shown in FIG. 1. Referring to FIG. 2, it can be observed that the lattice parameter changes due to substitution with titanium.

TABLE 1

| | Introduced raw materials (1.5M) | | | | | | Surface coating | 0.1 C | Coin cell life expectancy after 40 cycles of charging and | Particle | Full cell life expectancy after 60 cycles of charging and | |
|---|---|---|---|---|---|---|---|---|---|---|---|---|
| Sample ID | Co material | Ni material | Mn material | $TiO_2$ | $Na_2CO_3$ | $NH_4OH$ | ($TiO_2$) (wt %) | capacity (mAh/g) | discharging (%) | strength (MPa) | discharging (%) | Note |
| 1 | 0.10 | 0.20 | 0.70 | 0.00 | 1.05 | 0.60 | 1 | 258 | 95 | 111 | 97 | Example 1 |
| 2 | 0.10 | 0.20 | 0.70 | 0.00 | 1.05 | 0.60 | 2 | 256 | 94 | 117 | 96 | Example 2 |
| 3 | 0.10 | 0.20 | 0.70 | 0.02 | 1.05 | 0.60 | 0 | 260 | 91 | 80 | 85 | Comparative Example 2 |
| 4 | 0.10 | 0.20 | 0.70 | 0.00 | 1.05 | 0.60 | 0 | 265 | 93 | 93 | 89 | Comparative Example 1 |

Figure 3:
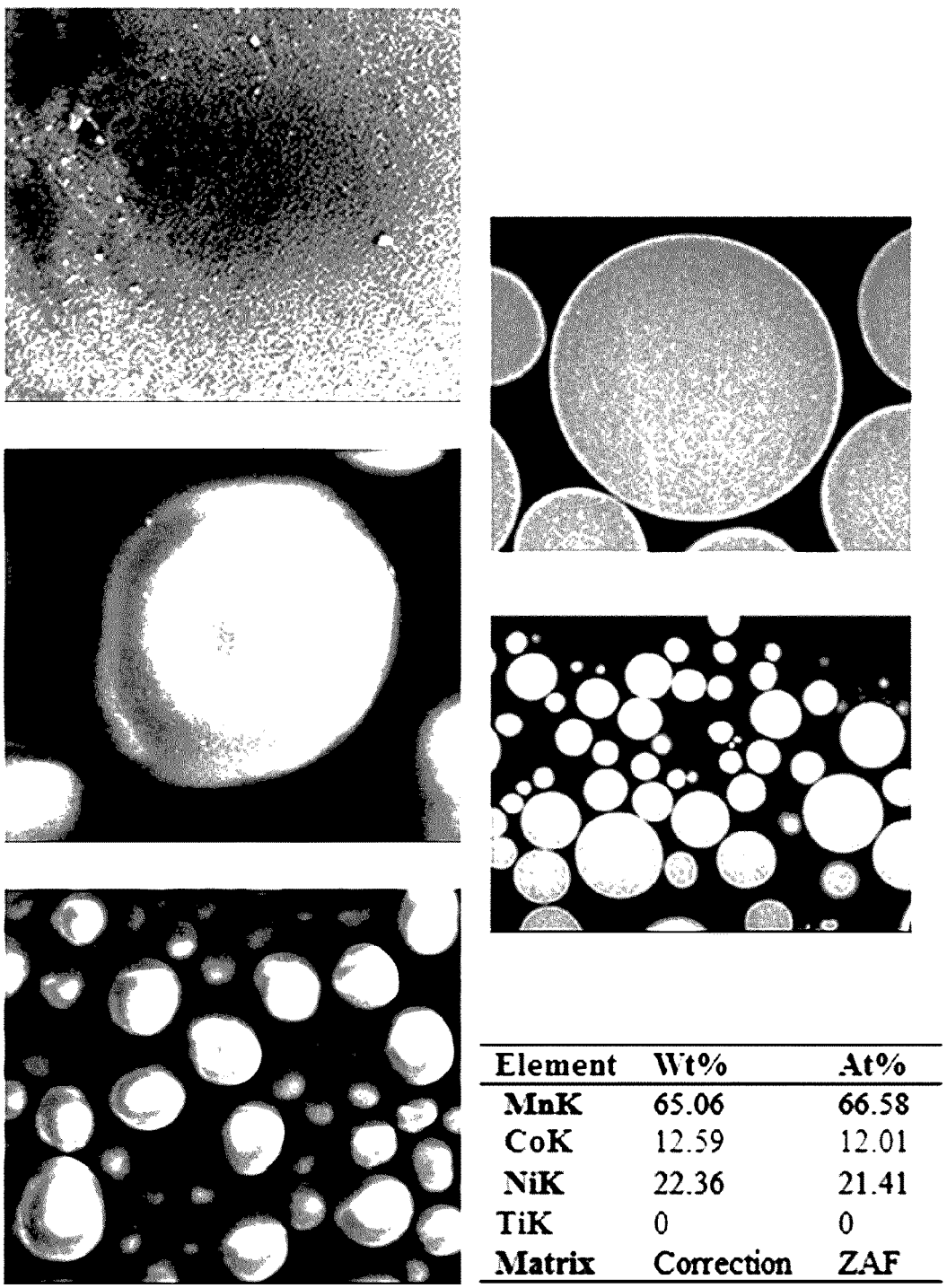
FIGS. 3 and 4 provide images showing the exterior and interior of the particle structure of a non-aqueous cathode material for a Li secondary battery and a spherical transition metal complex carbonate, which is a precursor of the non-aqueous cathode material, and tables listing constituent elements and their contents, wherein the non-aqueous cathode material was prepared according to the preparation method of Comparative Example 1.
Figure 4:
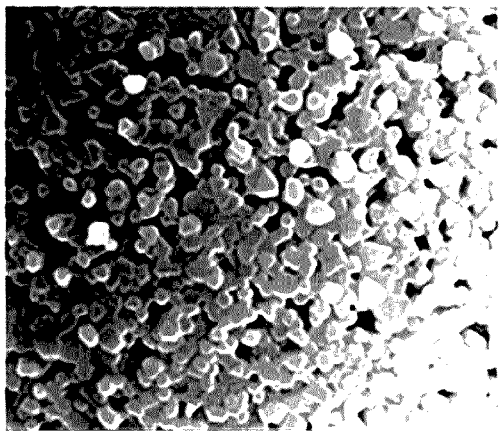
Figure 4:
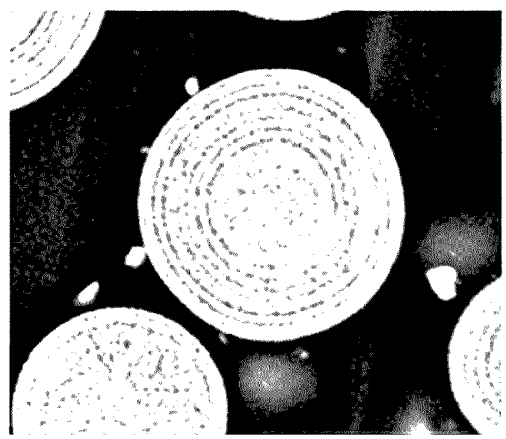
Figure 4:
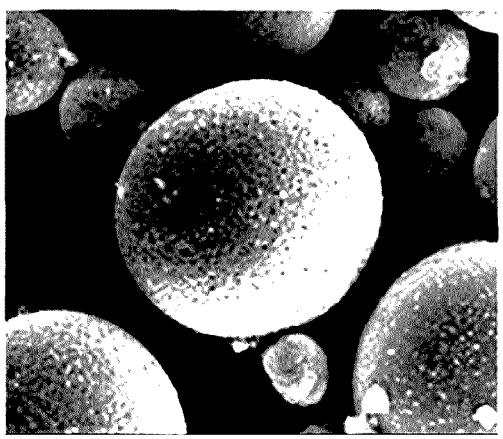
Figure 4:
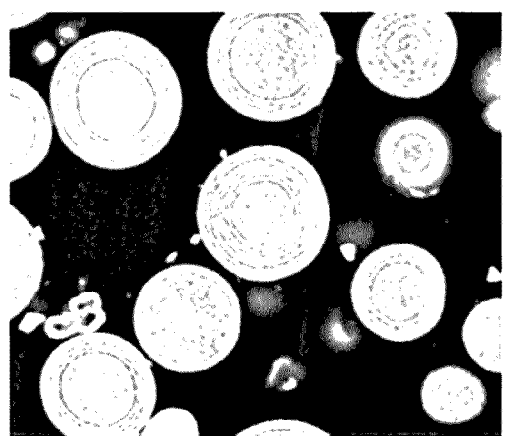
Figure 4:
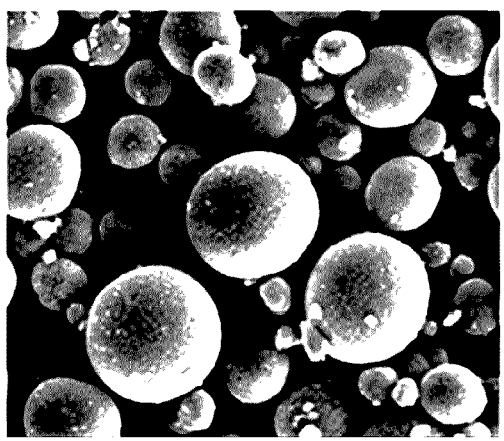
Figure 5:
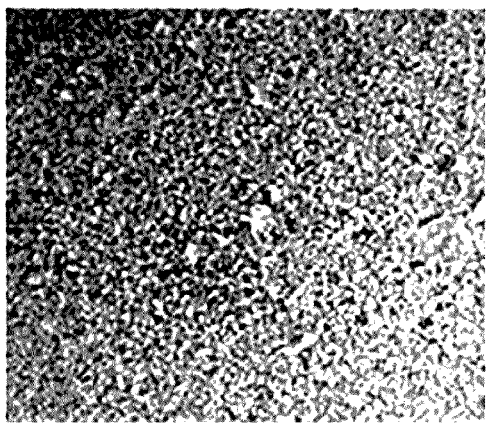
FIGS. 5 and 6 provide images showing the exterior and interior of the particle structure of a non-aqueous cathode material for a Li secondary battery and a spherical transition metal complex carbonate, which is a precursor of the non-aqueous cathode material, and tables listing constituent elements and their contents, wherein the non-aqueous cathode material was prepared according to the preparation method of Comparative Example 2.
Figure 5:
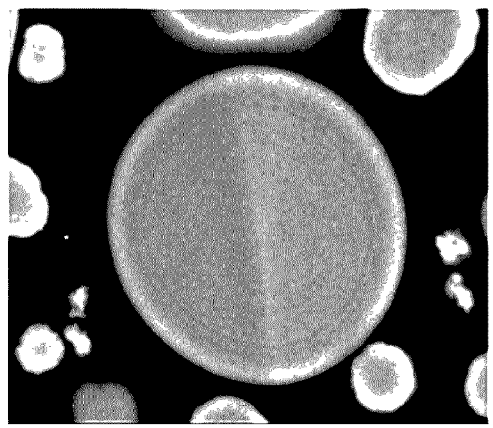
Figure 5:
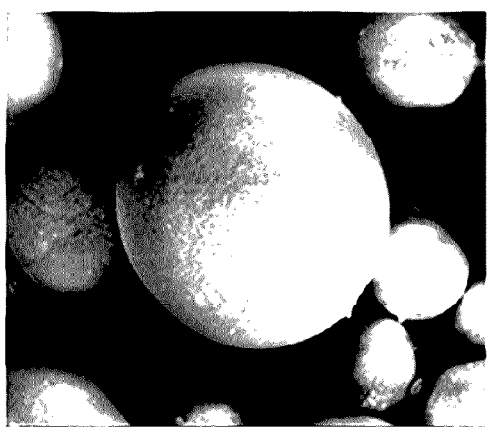
Figure 5:
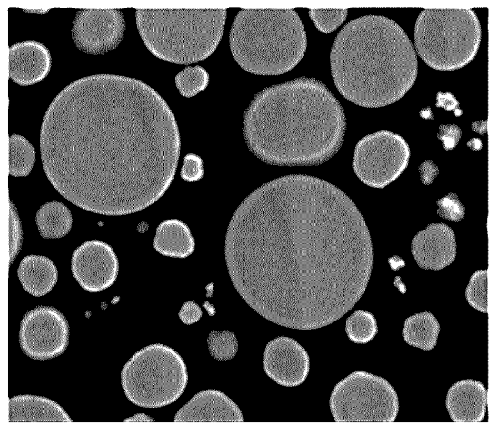
Figure 5:
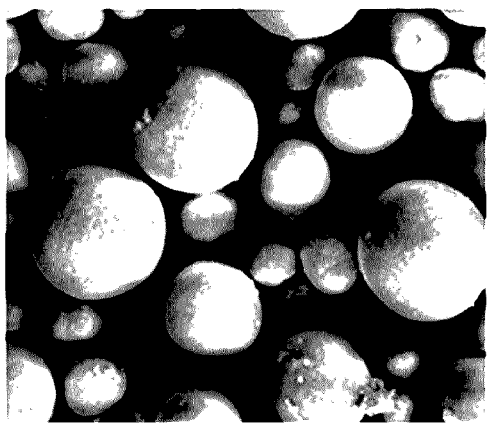
Figure 6:
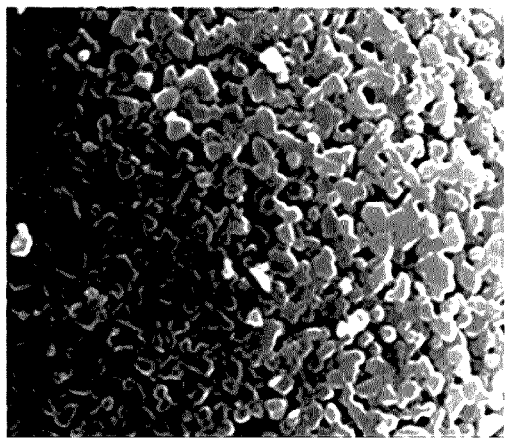
Figure 6:
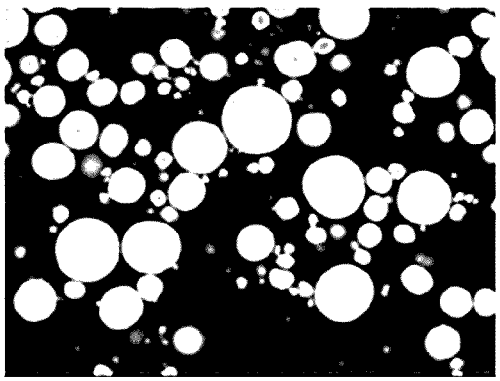
Figure 6:
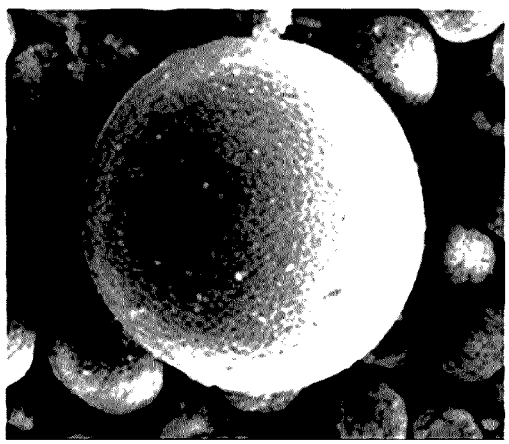
Figure 6:
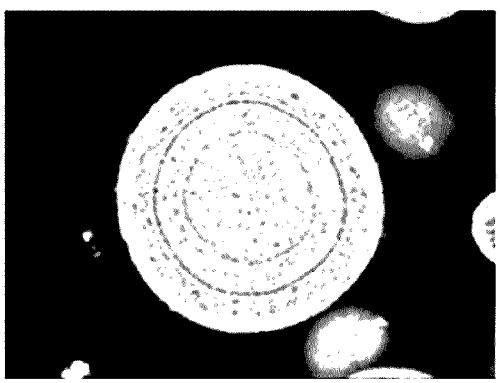
Figure 6:
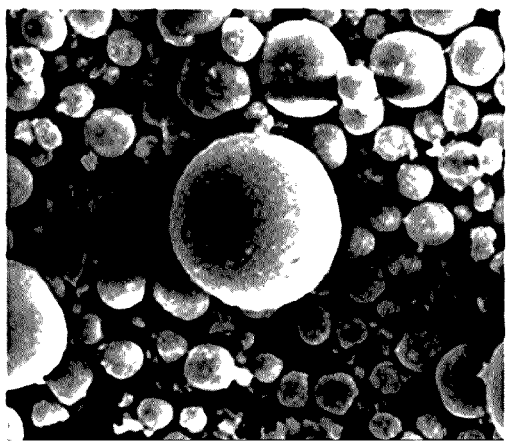
Figure 7:
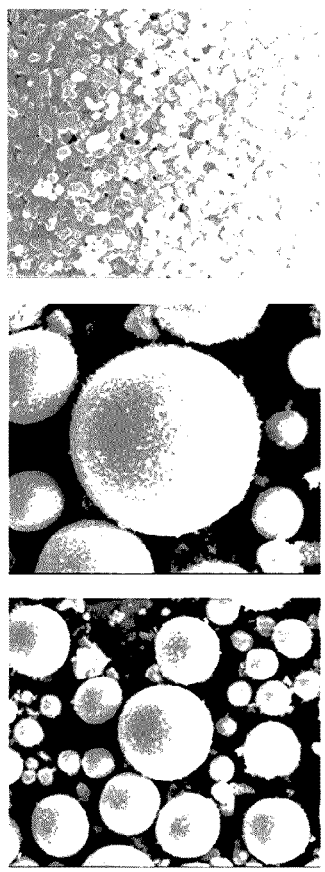
FIG. 7 provides images showing the exterior and interior of the particle structure of a non-aqueous cathode material for a Li secondary battery and a table listing constituent elements and their contents, wherein the non-aqueous cathode material was prepared according to the preparation method of Example 1.
Figure 7:
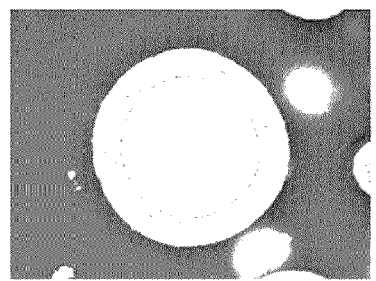
Figure 7:
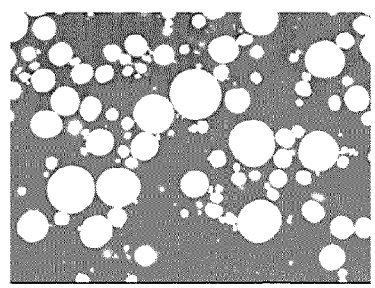
Figure 7:
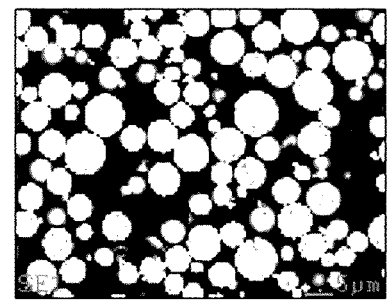
Figure 7:
Figure 7:
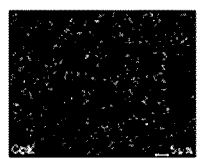
Figure 7:
Figure 7:
Figure 8:
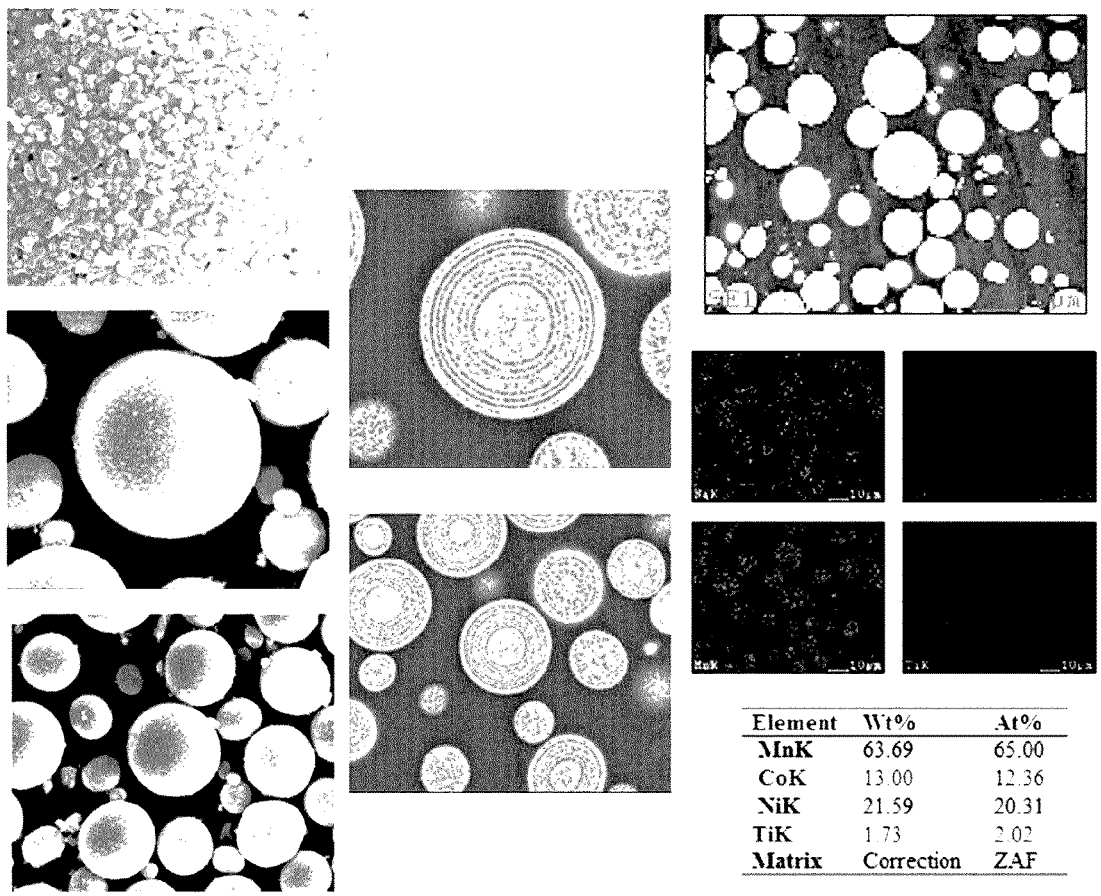
FIG. 8 provides images showing the exterior and interior of the particle structure of a non-aqueous cathode material for a Li secondary battery and a table listing constituent elements and their contents, wherein the non-aqueous cathode material was prepared according to the preparation method of Example 2.
Figure 9:
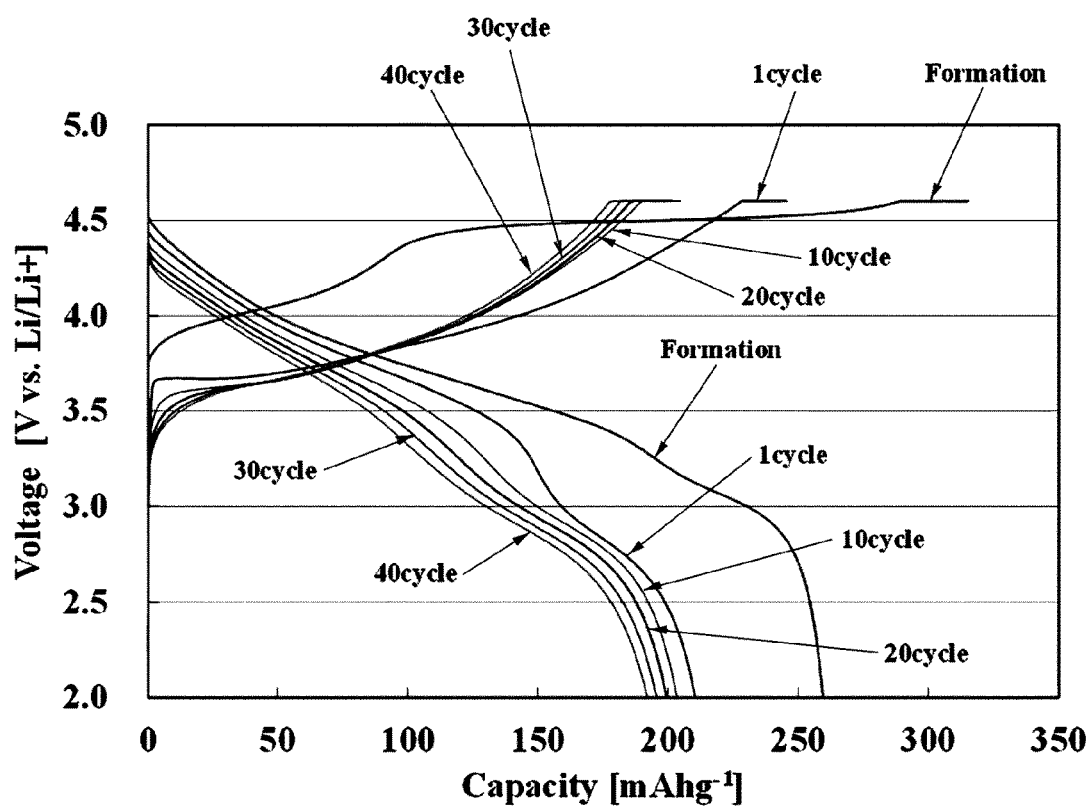
FIG. 9 is a graph showing the room-temperature charging and discharging characteristics of a Li-rich cathode material prepared according to the preparation method of Comparative Example 1, according to the number of cycles.
Figure 10:
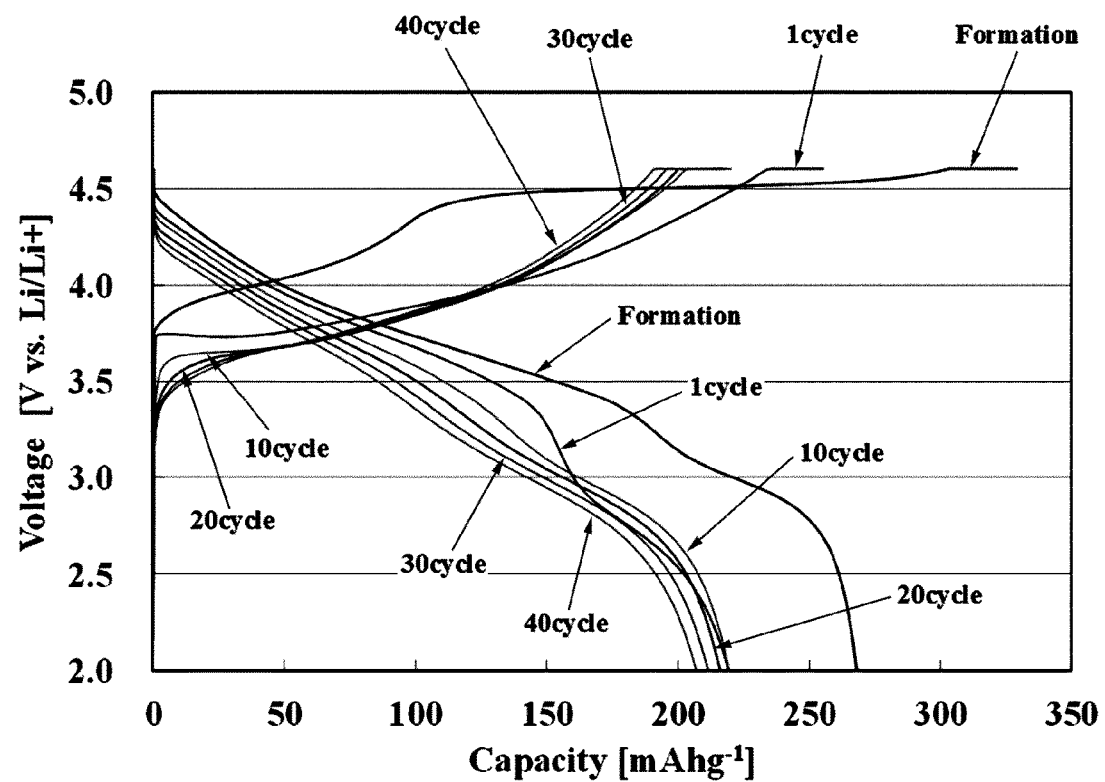
FIG. 10 is a graph showing the room-temperature charging and discharging characteristics of a Li-rich cathode material prepared according to the preparation method of Comparative Example 2, according to the number of cycles.
Figure 11:
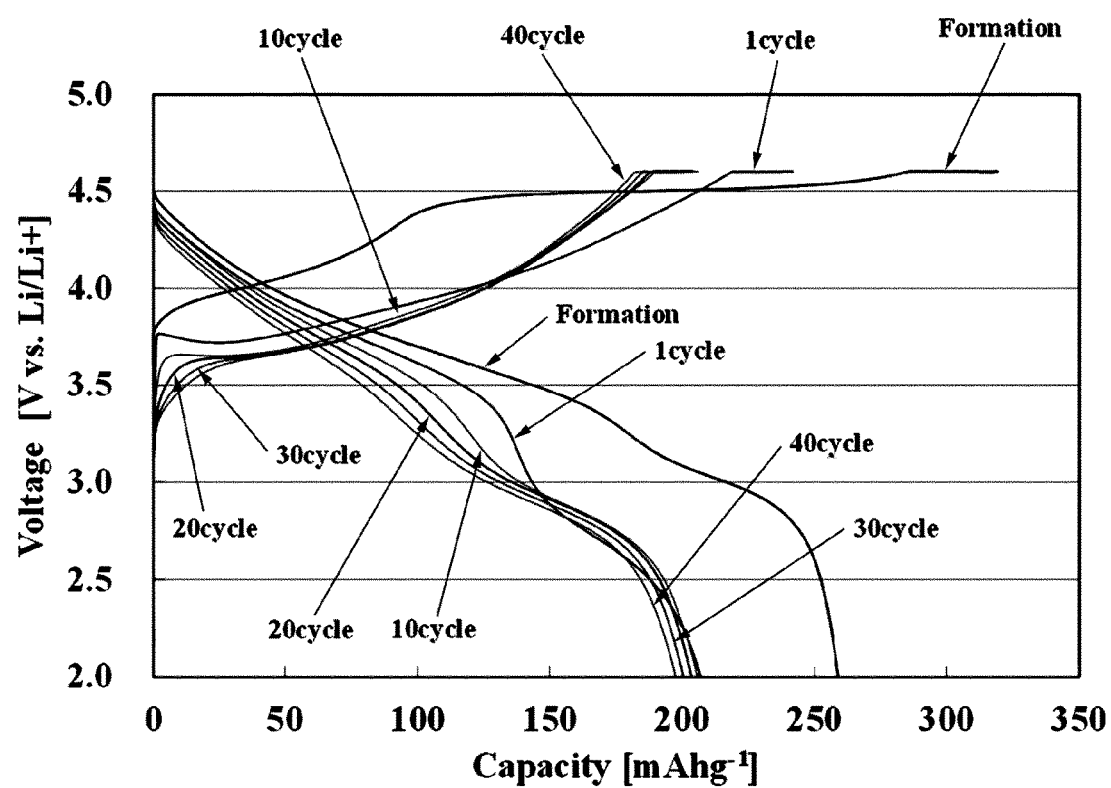
FIG. 11 is a graph showing the room-temperature charging and discharging characteristics of a Li-rich cathode material prepared according to the preparation method of Example 1, according to the number of cycles.
Figure 12:
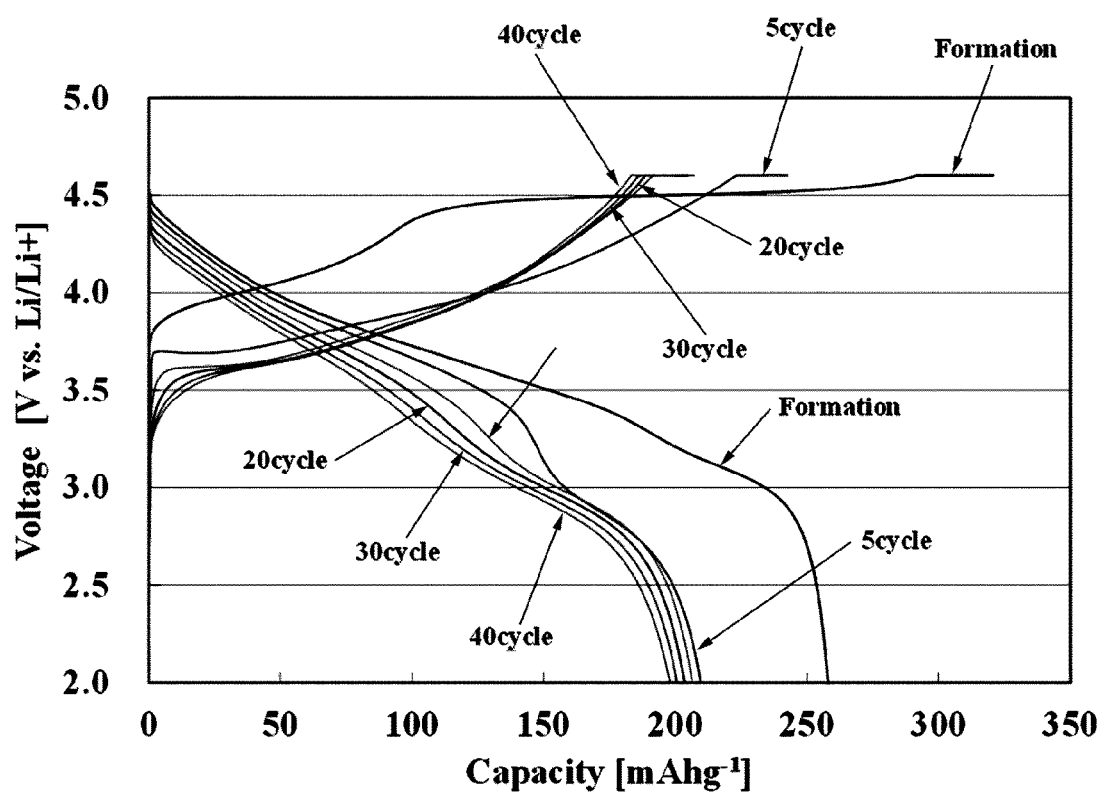
FIG. 12 is a graph showing the room-temperature charging and discharging characteristics of a Li-rich cathode material prepared according to the preparation method of Example 2, according to the number of cycles.
Figure 13:
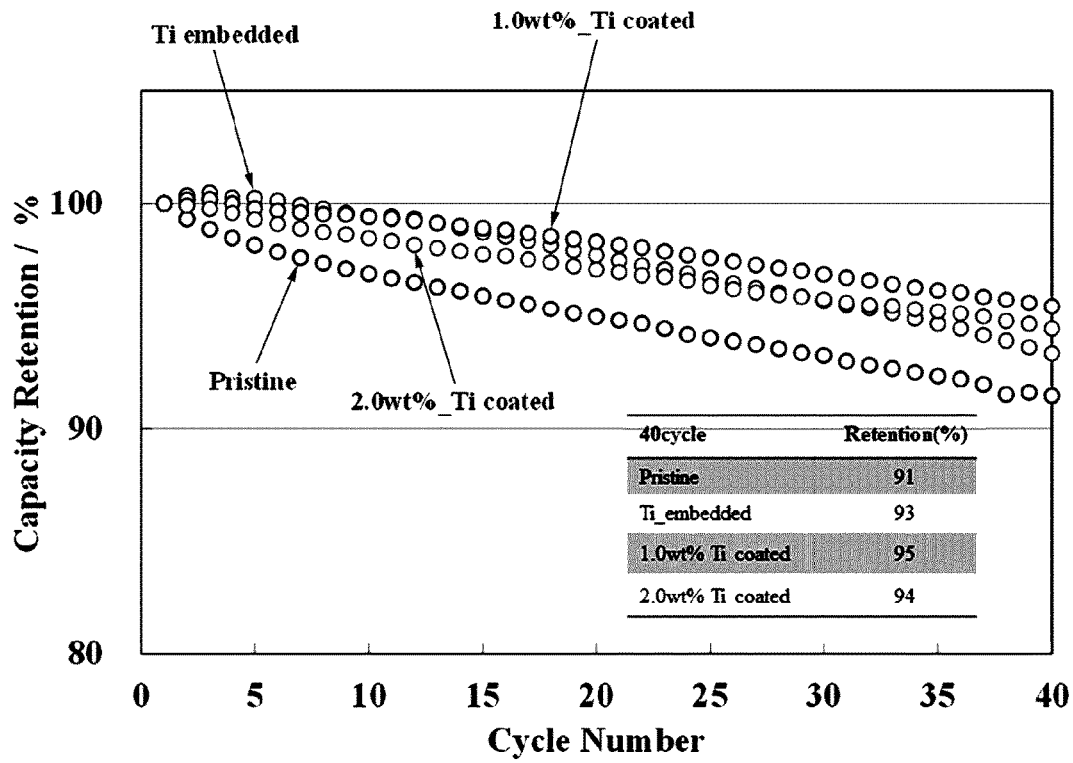
FIG. 13 is a graph showing the room-temperature charging and discharging cycle characteristics of Li-rich cathode materials prepared according to the preparation methods of Examples 1 and 2 and Comparative Examples 1 and 2.

FIGS. 3 to 8 are images showing the cathode materials ("Cathode") prepared by the preparation methods according to Comparative Example 1, Comparative Example 2, Example 1, and Example 2 and the precursors ("Precursor") thereof. That is, the FIGS. 3 and 4 provide images showing the exterior and interior of the particle structure of a non-aqueous cathode material for a Li secondary battery and a spherical transition metal complex carbonate, which is a precursor of the non-aqueous cathode material, and tables listing constituting elements and their contents, wherein the non-aqueous cathode material was prepared according to the preparation method of Comparative Example 1. FIGS. 5 and 6 provide images showing the exterior and interior of the particle structure of a non-aqueous cathode material for a Li secondary battery and a spherical transition metal complex carbonate, which is a precursor of the non-aqueous cathode material, and tables listing constituting elements and their contents, wherein the non-aqueous cathode material was prepared according to the preparation method of Comparative Example 2. FIG. 7 provides images showing the exterior and interior of the particle structure of a non-aqueous cathode material for a Li secondary battery and a table listing constituting elements and their contents, wherein the non-aqueous cathode material was prepared according to the preparation method of Example 1. FIG. 8 provides images showing the exterior and interior of the particle structure of a non-aqueous cathode material for a Li secondary battery and a table listing constituting elements and their contents, wherein the non-aqueous cathode material was prepared according to the preparation method of Example 2.

Looking at the images showing the structure of the cathode material prepared according to Example 1, it can be understood that the material is substituted with a Ti element, as shown in FIG. 7. FIG. 7 provides scanning electron microscopic (SEM) images and energy dispersive spectroscopic (EDS) images of the transition metal complex carbonate prepared according to Example 1. The EDS images are provided in the third column, second row, and, among the EDS images, the one in the second quadrant shows the distribution of nickel within a particle. The ones in the fourth quadrant and the first quadrant respectively show the distribution of titanium and cobalt within a particle. The one in the third quadrant shows the distribution of manganese within a particle. Based on the EDS images, it can be understood that titanium, cobalt, nickel, and manganese elements are uniformly contained in the transition metal complex carbonate of Example 1.

Like in the cathode material of Example 1, the transition metal complex carbonate in the cathode material prepared according to Example 2 contains titanium, cobalt, nickel, manganese elements uniformly as shown in FIG. 8.

Comparing the room-temperature charging and discharging characteristics, according to the number of cycles, of the cathode materials prepared according to the preparation methods of Comparative Example 1 (Pristine), Comparative Example 2 (Ti embedded), Example 1 (1 wt %_Ti coated) and Example 2 (2 wt %_Ti coated), it can be understood, as shown in FIGS. 9 to 13, that the cathode materials of Example 1 and Example 2 have good charging and discharging characteristics as compared to the cathode materials of Comparative Example 1 and Comparative Example 2.

Figure 14:
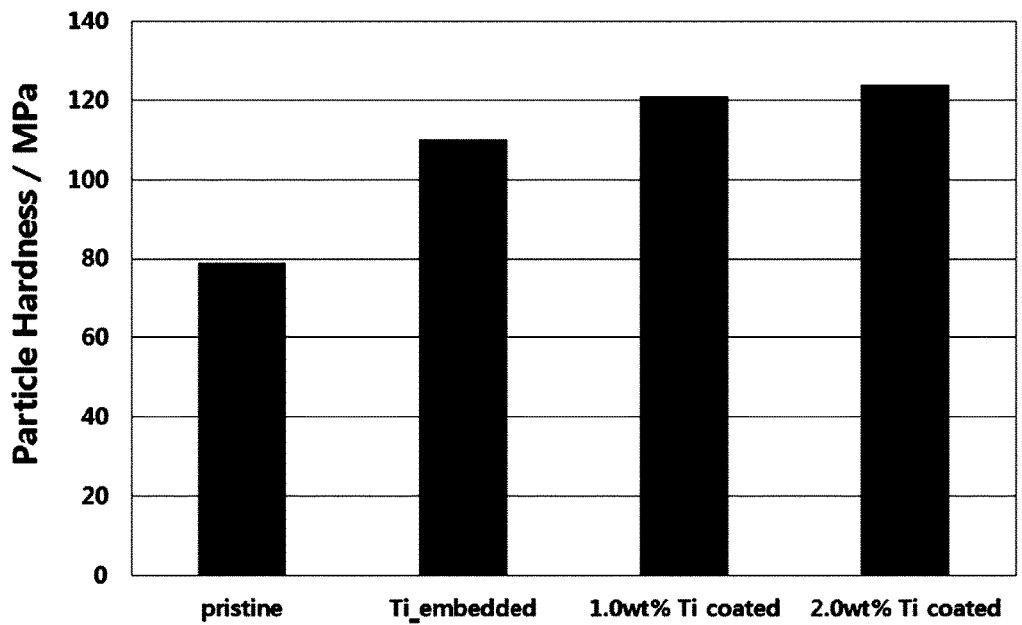
FIG. 14 is a graph showing the particle hardness of Li-rich cathode materials prepared according to the preparation methods of Examples 1 and 2 and Comparative Examples 1 and 2.

Comparing the particle hardness of the cathode materials prepared according to the preparation methods of Comparative Example 1, Comparative Example 2, Example 1, and Example 2, it can be understood, as shown in FIG. 14, that the cathode materials of Example 1 and Example 2 have a greater particle hardness as compared to the cathode materials of Comparative Example 1 and Comparative Example 2. That is, Examples 1 and 2 exhibiting outstanding capacity are observed to have a high particle hardness of 120 MPa. In contrast, Comparative Examples 1 and 2 are found to have a low particle hardness of 110 MPa or less. A low particle hardness is not desirable for a cathode material in an actual battery.

Figure 15:
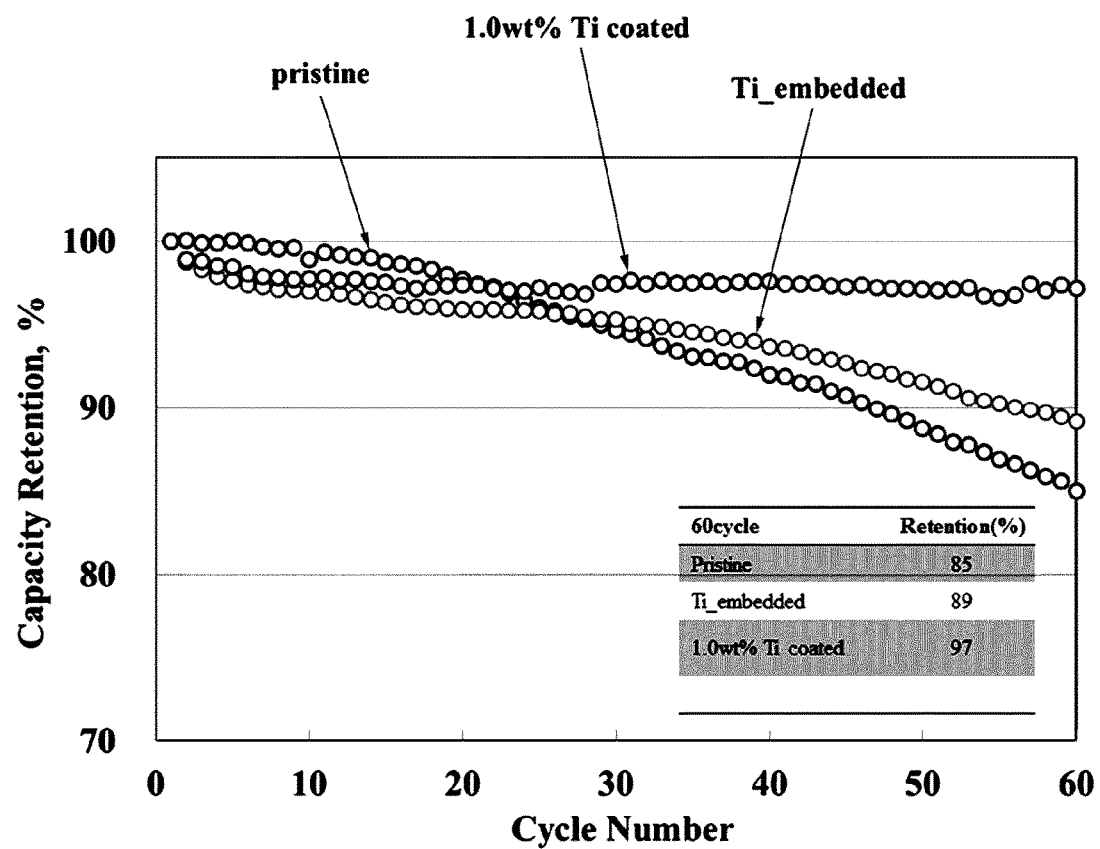
FIG. 15 is a graph showing the room-temperature full-cell charging and discharging cycle characteristics of Li-rich cathode materials prepared according to the preparation methods of Examples 1 and Comparative Examples 1 and 2.

Also, comparing the room-temperature full-cell charging and discharging cycle characteristics of the cathode materials prepared according to the preparation methods of Comparative Example 1, Comparative Example 2, and Example 1, it can be understood, as shown in FIG. 15, that the cathode material of Example 1 exhibit good charging and discharging cycle characteristics as compared to the cathode materials of Comparative Example 1 and Comparative Example 2. That is, in the case of Example 1, 97% of the initial capacity is maintained with a final charge voltage of 4.5 V, even after 60 cycles of life expectancy evaluation. However, in the case of Comparative Examples 1 and 2, less than 90% of the initial capacity is maintained under the same evaluation conditions.

As described, the Li-rich cathode material prepared according to the preparation method of Example 1 exhibits a 0.1C capacity of 250 mAh/g or more due to the titanium ions uniformly diffused and substituted thereinto. Not only that, it has a particle hardness of 120 MPa or more and is thus capable of maintaining 97% of the initial capacity after 60 cycles of charging and discharging, according to the results of full cell life expectancy evaluation. Therefore, the Li-rich cathode material prepared according to the preparation method of Example 1 is suitable as the Li secondary battery cathode material.

In contrast, the Comparative Example 1 not substituted with titanium is capable of exhibiting the 0.1C capacity of 260 mAh/g or more but has a low particle hardness such that, when actually applied into a battery, the battery properties deteriorate due to particle destruction and a side reaction with the electrolyte.

In the case of the Comparative Example 2 that was substituted with titanium to prevent the above problem from occurring, the particle hardness is enhanced, but not sufficiently that only 89% of the initial capacity is maintained after 60 cycles, according to the results of full cell life expectancy evaluation.

In other words, an improvement in the performance of the cathode materials of Examples 1 and 2 was possible as the preparation of a Li-rich cathode material substituted uniformly with titanium from the surface to the interior was enabled by coating the cathode material with nano-sized titanium dioxide at a precursor level. In particular, the titanium diffusion and substitution from the surface enhanced the structural stability of the cathode materials during an electrochemical surface reaction such that the cathode materials could exhibit the 0.1C capacity of 250 mAh/g or more and outstanding life expectancy.

The embodiments disclosed in this specification and drawings are only examples to help understanding of the invention and the invention is not limited thereto. It is clear to those skilled in the art that various modifications based on the technological scope of the invention in addition to the embodiments disclosed herein can be made.

The invention claimed is:

1. A method of preparing a non-aqueous cathode material for a lithium secondary battery, the method consisting of:
   a process of preparing a spherical transition metal complex carbonate by co-precipitating an aqueous solution in which a nickel material, a cobalt material, a manganese material, a carbonate group material, and an ammonia material are mixed;
   a process of coating a surface of the spherical transition metal complex carbonate with nano-sized titanium dioxide; and
   a process of preparing a spherical lithium-rich cathode material by mixing a lithium material with the spherical transition metal complex carbonate coated with the nano-sized titanium dioxide and performing a heat treatment thereon,
   wherein, in the process of preparing the spherical transition metal complex carbonate,
      a concentration of each of the cobalt material, nickel material, manganese material, carbonate group material, and ammonia material is in a range of 0.5 to 2 M, and
      the cobalt material, nickel material, manganese material, carbonate group material, and ammonia material are mixed in a ratio of (cobalt material +nickel material +manganese material):carbonate group material:ammonia material=1:1.8 to 2.5:0.5 to 1.5, and a pH of the aqueous solution is maintained in a range of 7 to 9.

2. The method of claim 1, where in the process of coating, the spherical transition metal complex carbonate coated with nano-sized titanium dioxide has a composition ratio of $Ni_xCo_yMn_{1-x-y}Ti_zCO_3$ (0.0<x≤0.3, 0.0<y≤0.2, 0.01≤z≤0.1, 0.5≤1−x−y) and an average particle size of 5 to 25 μm.

3. The method of claim 1, wherein the process of coating consists of:
   a process of mixing the spherical transition metal complex carbonate with a suspension containing the nano-sized titanium dioxide; and
   a process of coating a surface of the spherical transition metal complex carbonate with the nano-sized titanium dioxide by drying the mixed suspension that was mixed with the spherical transition metal complex carbonate.

4. The method of claim 1, wherein the lithium material is lithium carbonate.

5. The method of claim 4, wherein in the process of preparing the spherical lithium-rich cathode material, the heat treatment is performed at a temperature in a range of 900 to 1100° C.

6. A method of preparing a non-aqueous cathode material for a lithium secondary battery, the method consisting of:
   a process of preparing a spherical transition metal complex carbonate by co-precipitating an aqueous solution in which a nickel material, a cobalt material, a manganese material, a carbonate group material, and an ammonia material are mixed;
   a process of coating a surface of the spherical transition metal complex carbonate with nano-sized titanium dioxide;
   a process of preparing a spherical lithium-rich cathode material by mixing a lithium material with the spherical transition metal complex carbonate coated with the nano-sized titanium dioxide and performing a heat treatment thereon; and
   a process of pulverizing the spherical lithium-rich cathode material into a powder,
   wherein, in the process of preparing the spherical transition metal complex carbonate,
      a concentration of each of the cobalt material, nickel material, manganese material, carbonate group material, and ammonia material is in a range of 0.5 to 2 M, and
      the cobalt material, nickel material, manganese material, carbonate group material, and ammonia material are mixed in a ratio of (cobalt material +nickel material +manganese material):carbonate group material:ammonia material=1:1.8 to 2.5:0.5 to 1.5, and a pH of the aqueous solution is maintained in a range of 7 to 9.

7. The method of claim 1, wherein the process of preparing the spherical a lithium-rich cathode material, the spherical lithium-rich cathode material has a composition ratio of $Li_wNi_xCo_yMn_{1-x-y-z}Ti_zO_2$ (0.0<x≤0.3, 0.0<y<0.2, 0.5≤1−x−y−z, 0.01≤z≤0.1, 1.2≤w≤1.7), and has an average particle size of 5 to 25 μm.

* * * * *